(12) United States Patent
Klein (10) Patent No.: US 10,011,153 B1
(45) Date of Patent: Jul. 3, 2018

(54) SUSPENSION FOR VANS OR SEMI-TRAILERS MOUNTED UNDER A SLIDING FRAME, WHICH FRAME HAS BOLTED-IN CROSS MEMBERS, INDEPENDENT AIR SPRING TOWERS, AND, OIL-FREE SHOCKS

(71) Applicant: Jason M. Klein, Nixa, MO (US)

(72) Inventor: Jason M. Klein, Nixa, MO (US)

(*) Notice: Subject to any disclaimer, the term of this patent is extended or adjusted under 35 U.S.C. 154(b) by 249 days.

(21) Appl. No.: 14/667,214

(22) Filed: Mar. 24, 2015

Related U.S. Application Data (60) Provisional application No. 61/969,477, filed on Mar. 24, 2014, provisional application No. 62/112,911, filed on Feb. 6, 2015.

(51) Int. Cl.
  *B60G 11/28* (2006.01)
  *B62D 21/11* (2006.01)
  *B62D 53/06* (2006.01)

(52) U.S. Cl.
  CPC .............. *B60G 11/28* (2013.01); *B62D 21/11* (2013.01); *B62D 53/068* (2013.01)

(58) Field of Classification Search
  CPC ........ B60G 11/28; B62D 21/11; B62D 53/068
  See application file for complete search history.

(56) References Cited

U.S. PATENT DOCUMENTS

| | | | |
|---|---|---|---|
| 2,901,240 A | 8/1959 | Fikse | 267/189 |
| 3,332,702 A | 7/1967 | Rosenkrands | 280/124.107 |
| 3,386,724 A | 6/1968 | Cheiger | 267/52 |
| 3,510,149 A | 5/1970 | Raidel | 280/86.75 |
| 3,861,708 A | 1/1975 | Fier | 280/86.5 |
| 4,415,179 A | 11/1983 | Marinelli | 280/124.116 |
| 4,500,112 A | 2/1985 | Raidel | 280/124.109 |
| 4,991,868 A * | 2/1991 | VanDenberg | B60G 7/02 280/124.116 |
| 5,375,871 A | 12/1994 | Mitchell et al. | 280/688 |
| 5,403,031 A | 4/1995 | Gottschalk et al. | 280/704 |
| 5,921,570 A | 7/1999 | Lie | 280/124.175 |
| 6,843,490 B2 | 1/2005 | Raidel, II et al. | 280/124.116 |
| 7,165,777 B2 | 1/2007 | Ziech et al. | 280/124.11 |
| 7,267,348 B1 | 9/2007 | Klein et al. | 280/124.128 |
| 7,717,442 B2 | 5/2010 | Chalin | 280/124.116 |
| 8,496,259 B2 * | 7/2013 | Ramsey | B60G 9/003 180/209 |
| 8,540,222 B2 | 9/2013 | Westnedge et al. | 267/64.27 |
| 8,919,793 B1 | 12/2014 | Klein et al. | 280/124.116 |

(Continued)

*Primary Examiner* — Faye M Fleming
(74) *Attorney, Agent, or Firm* — Jonathan A. Bay (57) ABSTRACT

A suspension for vans or semi-trailers has a sliding (or slider) frame that can be slid longitudinally between spaced, left and right trailer stringers. The sliding frame is coupled within the stringers for longitudinal sliding between forward and rearward extremes. The sliding frame is formed by a pair of left and right rails spaced by two or three or more cross members. The sliding frame has an even number of independent air-spring support towers. The support towers are welded to the rails, but the cross members are bolted. The air-spring support towers can take semi-funnel shapes to having a lower narrower end forming an air-spring seat, and flaring upwardly from there to upper ends connected high on the rails to funnel the weight of the van or trailer from over a wider area to more of a pinpoint distribution on the air-spring seat.

17 Claims, 10 Drawing Sheets

(56) References Cited

U.S. PATENT DOCUMENTS

| | | |
|---|---|---|
| 2004/0021288 A1 | 2/2004 | Raidel, II et al. ..... 280/124.177 |
| 2006/0113741 A1 | 6/2006 | Chalin ................... 280/124.116 |
| 2016/0096408 A1* | 4/2016 | Hicks ................... B60G 99/002 |
| | | 280/124.109 |

* cited by examiner

SUSPENSION FOR VANS OR SEMI-TRAILERS MOUNTED UNDER A SLIDING FRAME, WHICH FRAME HAS BOLTED-IN CROSS MEMBERS, INDEPENDENT AIR SPRING TOWERS, AND, OIL-FREE SHOCKS

CROSS-REFERENCE TO PROVISIONAL APPLICATION(S)

This application claims the benefit of U.S. Provisional Application No. 61/969,477, filed Mar. 24, 2014, and, U.S. Provisional Application No. 61/969,477, filed Feb. 6, 2015. The foregoing patent disclosures are incorporated herein by this reference thereto.

BACKGROUND AND SUMMARY OF THE INVENTION

The invention relates to suspensions for vans or semi-trailers and, more particularly, to a sliding frame under which the suspension that is mounted under. The sliding frame preferably has independent air-springs support towers, as well as cross-members which are preferably bolted in (and not welded), as well as oil-free shocks.

Pause can be taken to give the last option, the oil-free shocks, a little further introduction. It is one (among others) object of the invention to provide suspensions for vans or semi-trailers with a hydraulic-oil free (or substantially oil or grease free) shock absorber in use in replacement of the more conventional hydraulic oil shock, or petroleum-product lubricated shock. A further aspect of this relates to a ride air dampened, external air suspension damping system.

Air-spring equipped truck and trailer air-spring suspension systems use an air spring to carry vehicle load and provide suspension movement. But these suspensions still need a means to dampen the air spring so that the air suspension does not bounce due to a condition known as an "under-dampened" spring condition. To do this, suspensions use a shock absorber (damper). The main purpose of the shock absorber is to keep the suspension from bouncing so that the tire stays on the road for stability and for evening the tire wear.

Current truck and trailer air-spring suspensions are believed to use one or the other of two options to dampen the suspension.

Conventional means to dampen the air suspension include using an independently mounted hydraulic shock absorber in conjunction with the air spring. The shock absorber has internal fluid and orifices that work to dampen the bouncing movement of the air spring in both up (compression) and down (rebound) travel.

A recent introduction to the market employs an air spring that has—internal to itself, the air spring—means to dampen itself, in compression and rebound, so that an external hydraulic shock absorber is not needed for system operation.

It is an object of the invention to separate the two functions once again to two separate devices—spring in one device and damper in the other—while making the damper not only oil-free but also pneumatic. See U.S. Pat. No. 8,540,222—Westnedge et al. It is believed this offers better options for designing for capacity, for height variation options among (say) stepped-deck low ride to flat deck high ride, independent control over factors governing spring function versus factors governing damper function, and so on.

What is offered here is an improvement which overcomes the shortcomings of the prior art.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 10 is a partially exploded perspective view of the Box-Z shaped sliding frame of FIG. 9 alone in isolation, wherein FIG. 4 shows a Box-I shaped counterpart sliding frame.

DETAILED DESCRIPTION OF THE PREFERRED EMBODIMENTS

FIGS. 1-10 show a suspension 20 in accordance with invention for vans or semi-trailers 22. The suspension 20 includes a sliding frame 25I,25Z that can be slid longitudinally between spaced, left and right trailer stringers 26. The stringers 26 are fastened or welded to the bottom 28 of a van or semi-trailer 22. The sliding frame 25I,25Z is coupled within the stringers 26 for longitudinal sliding between forward and rearward extremes.

The suspension 20 preferably comprises four (or more) independent air spring support towers 30 which do not have the additional support of a cross-brace, or K-shaped brace, which if present would lend additional support of the air spring loading into the sliding frame 25I,25Z. This provides for reduced weight (and perhaps improved durability).

The sliding frame 25I,25Z is also connected together by using the inboard-disposed, air spring support towers 30 that channel the hanger load (ie., of hangers 52) into the sliding frame 25I,25Z. This is believed to provide for improved durability (and perhaps reduced weight). The air-spring support towers 30 can take semi-funnel shapes to having a lower narrower end forming an air-spring abutment, and flaring upwardly from there to upper ends connected high on the rails 32 to funnel the weight of the van or trailer 22 from over a wider area to more of a pinpoint distribution on the air-spring abutment.

Figure 1:
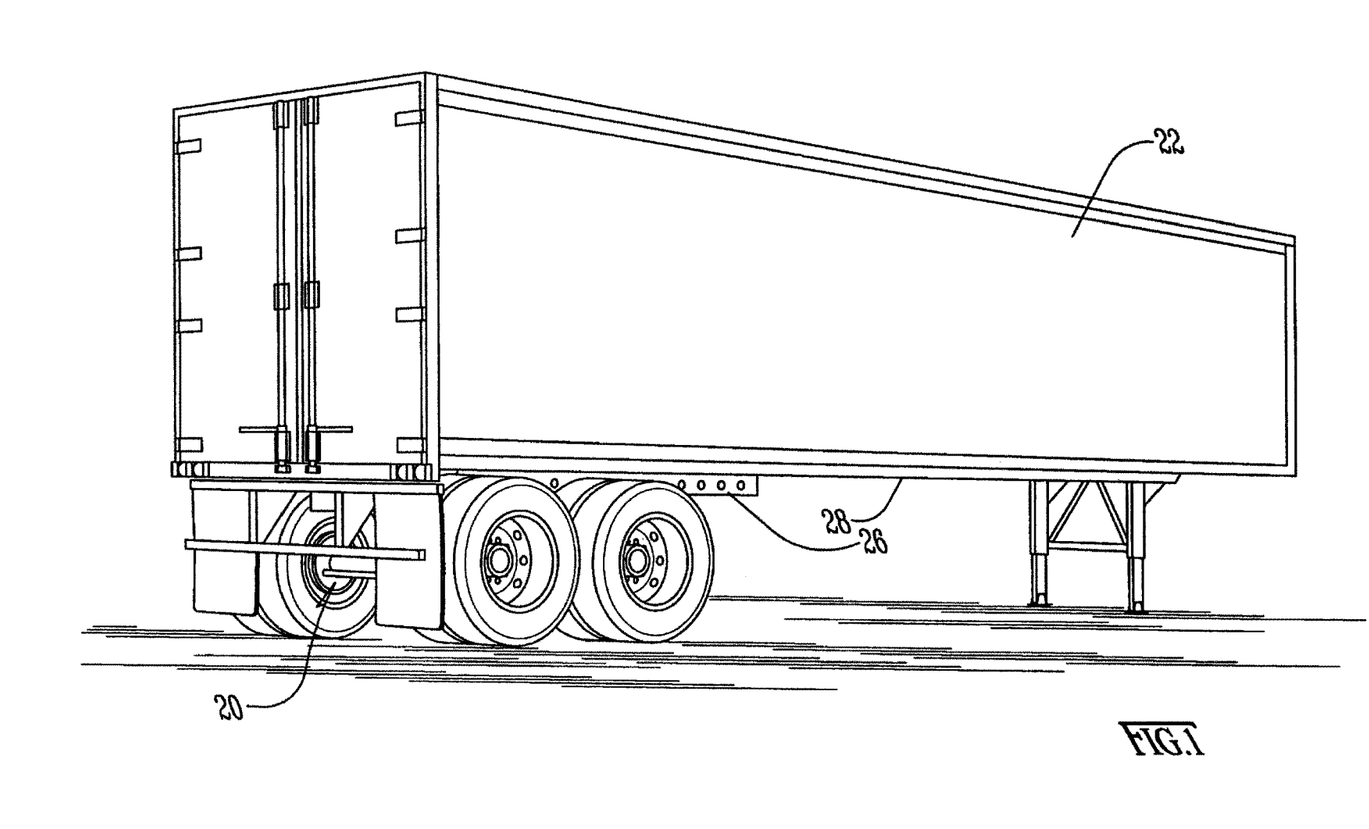
FIG. 1 is a perspective view of a suspension in accordance with the invention, for vans or semi-trailers.
Figure 2:
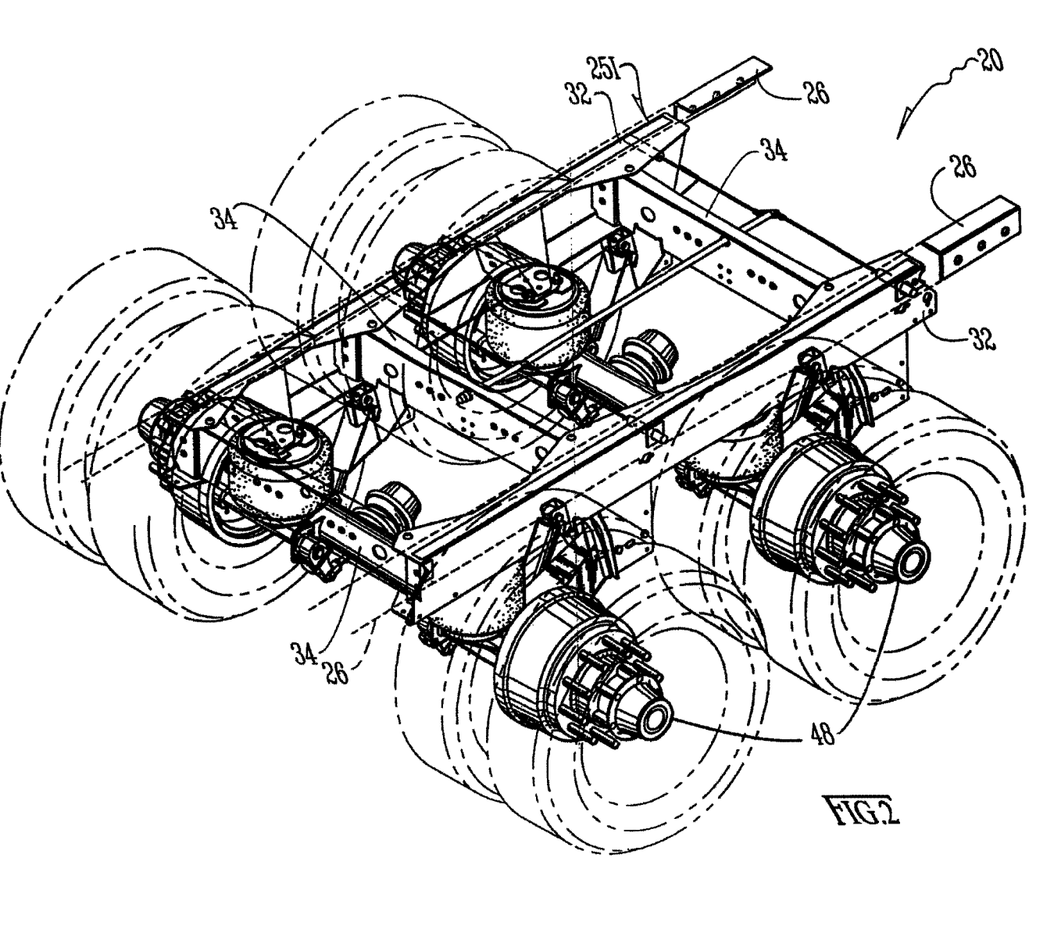
FIG. 2 is a perspective view of a sliding frame and suspension in accordance with the invention, and taken from FIG. 1, except on an enlarged scale and with most of the trailer removed from view (portions of the stringers are kept in the view)
Figure 3:
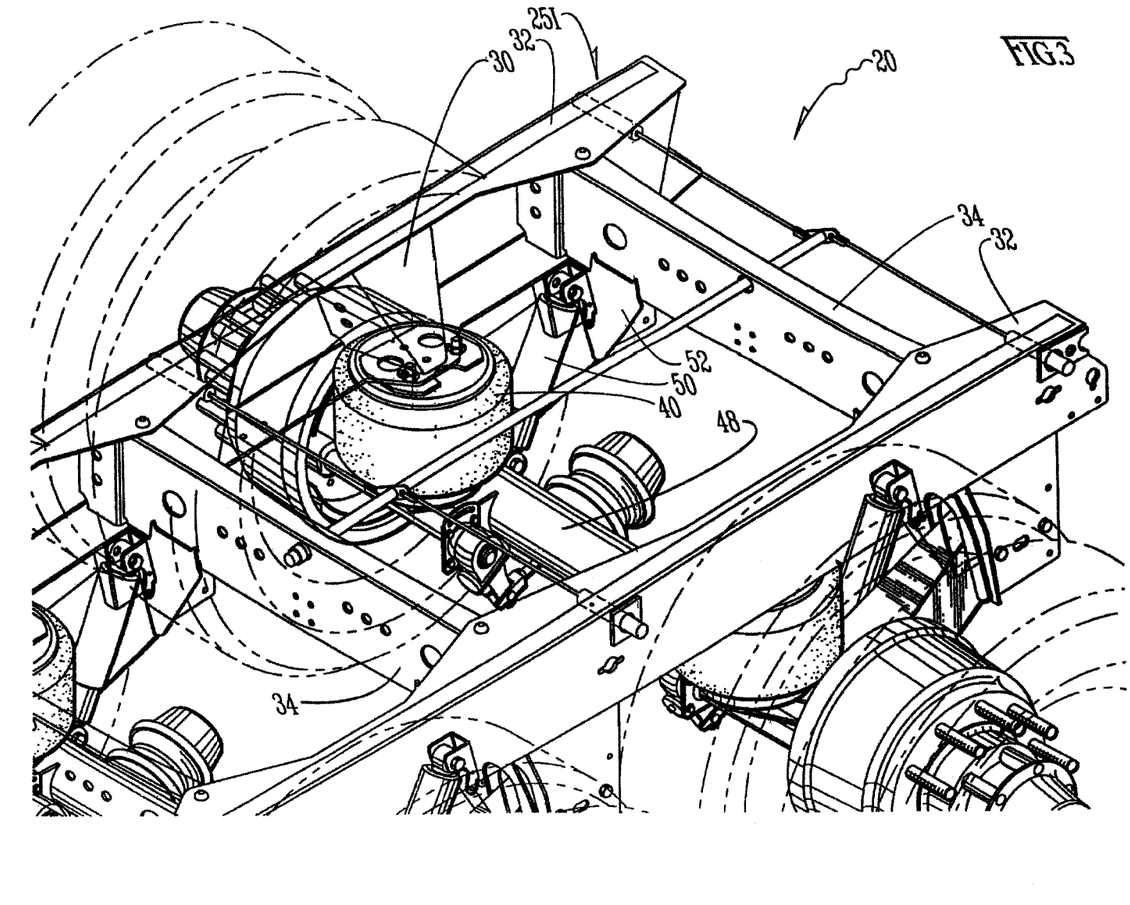
FIG. 3 is an enlarged scale detail view of a sliding frame in accordance with the, under which a suspension for vans or semi-trailers is mounted.
Figure 4:
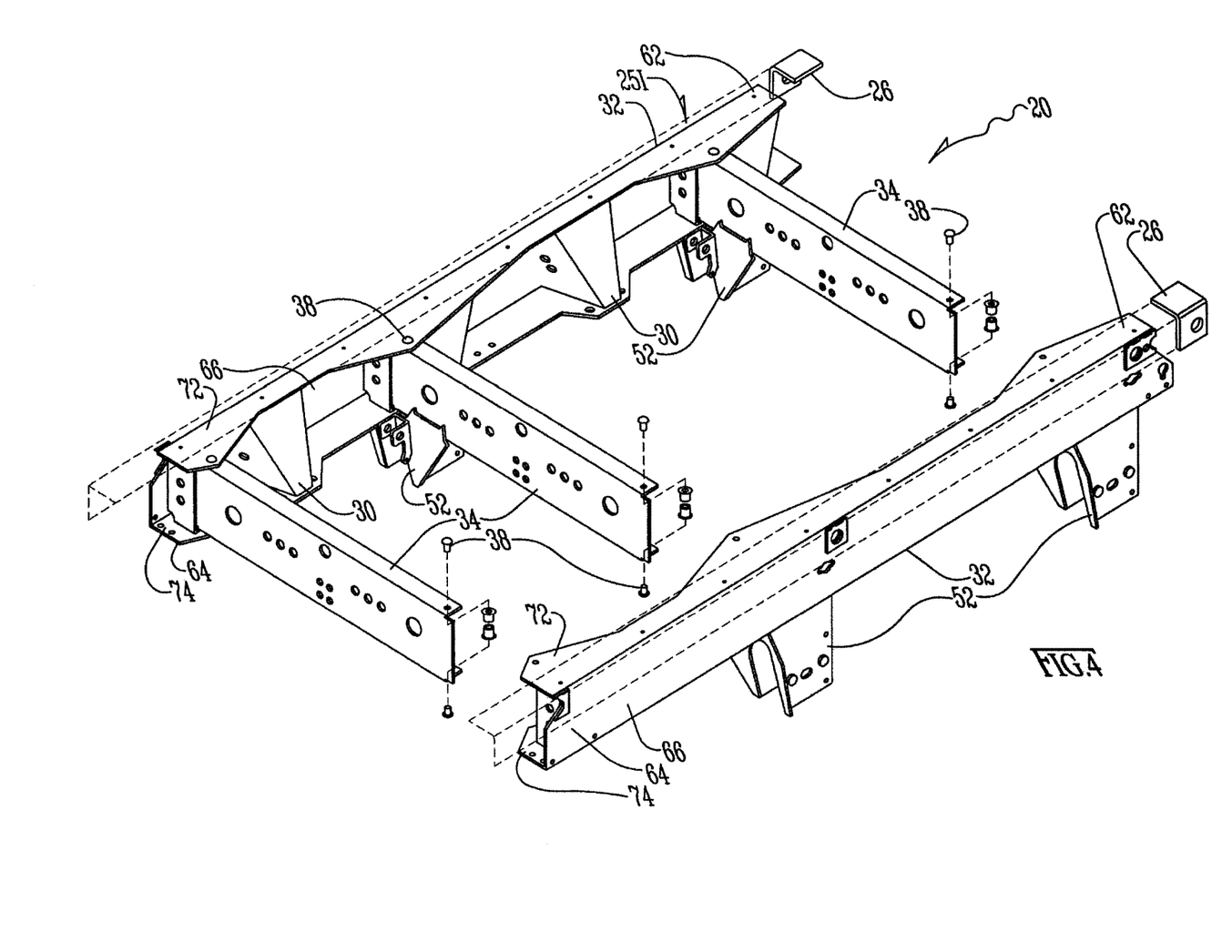
FIG. 4 is a partially exploded perspective view of the Box-I shaped sliding frame of FIG. 2 alone in isolation.
Figure 5:
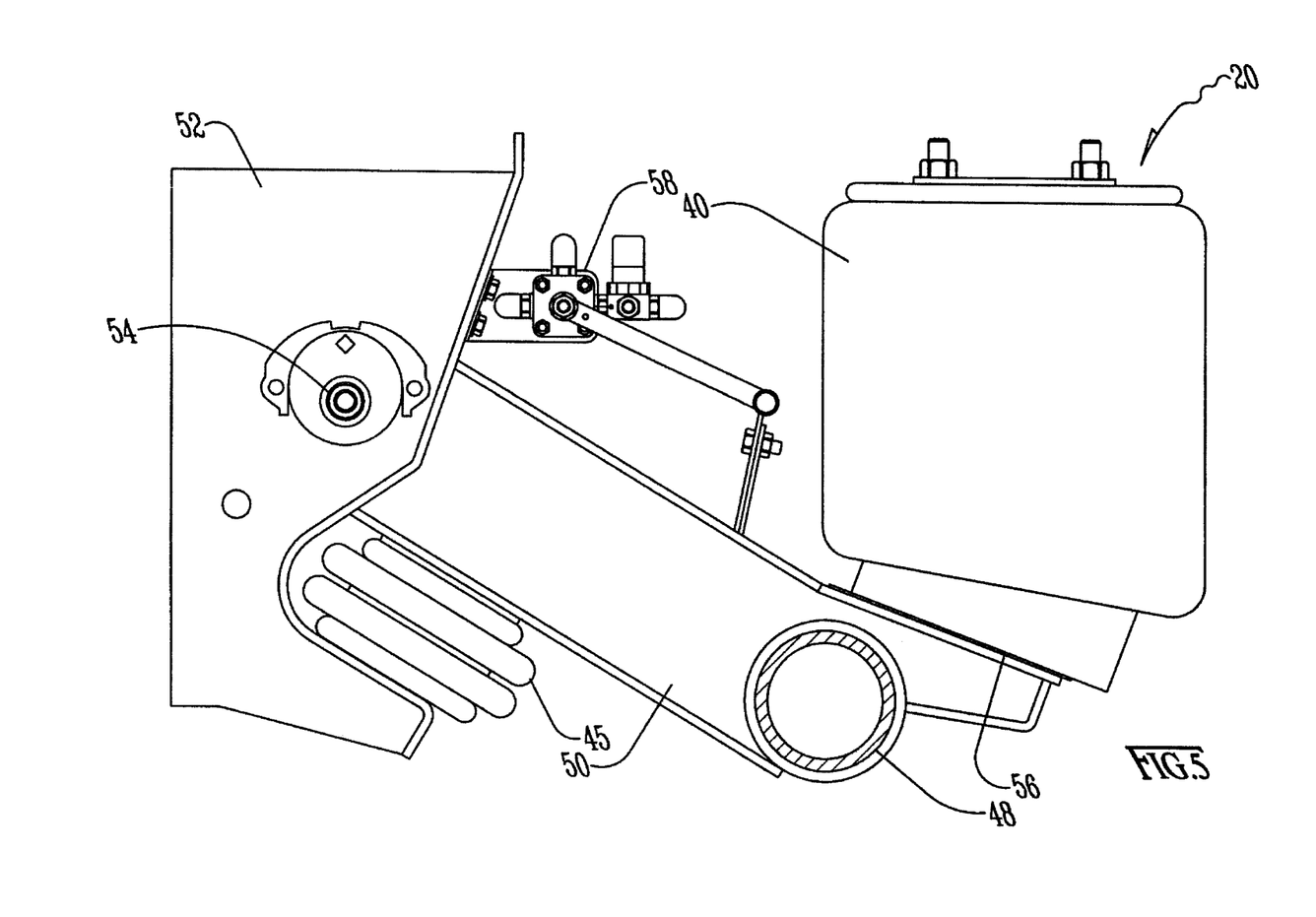
FIG. 5 is a side elevation view of a single-axle suspension in accordance with invention for vans or semi-trailers and showing (a) a primary air spring in an extended-down travel mode and (b) a secondary air spring in service as a shock absorber (damper) in a compression (positive pressurization) damping mode.
Figure 6:
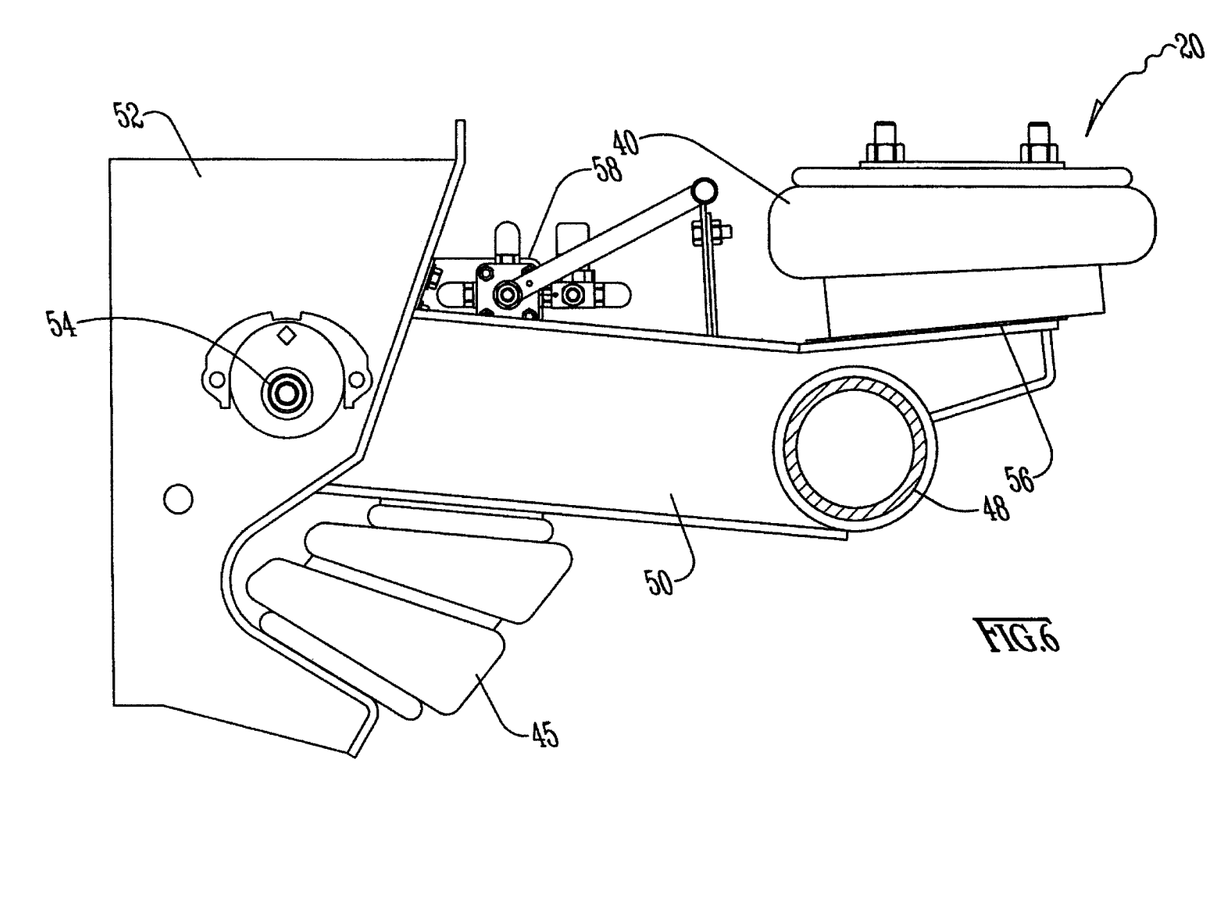
FIG. 6 is a side elevation view comparable to FIG. 5 except showing (a) the primary air spring in a compressed-up travel mode and (b) the secondary air spring in service as a shock absorber in an extended (vacuum or negative pressurization) damping mode.
Figure 7:
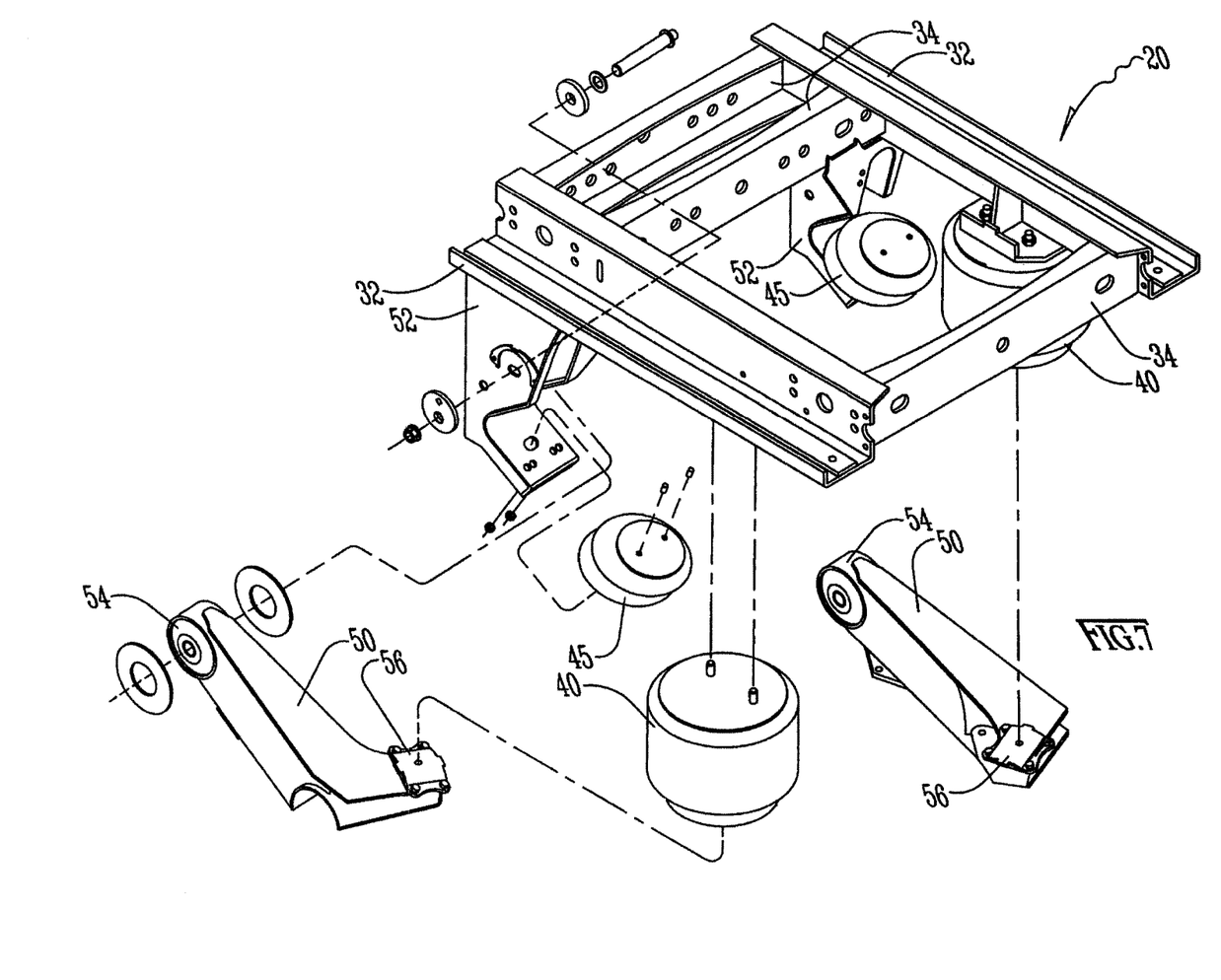
FIG. 7 is an exploded perspective view of FIG. 5.
Figure 8:
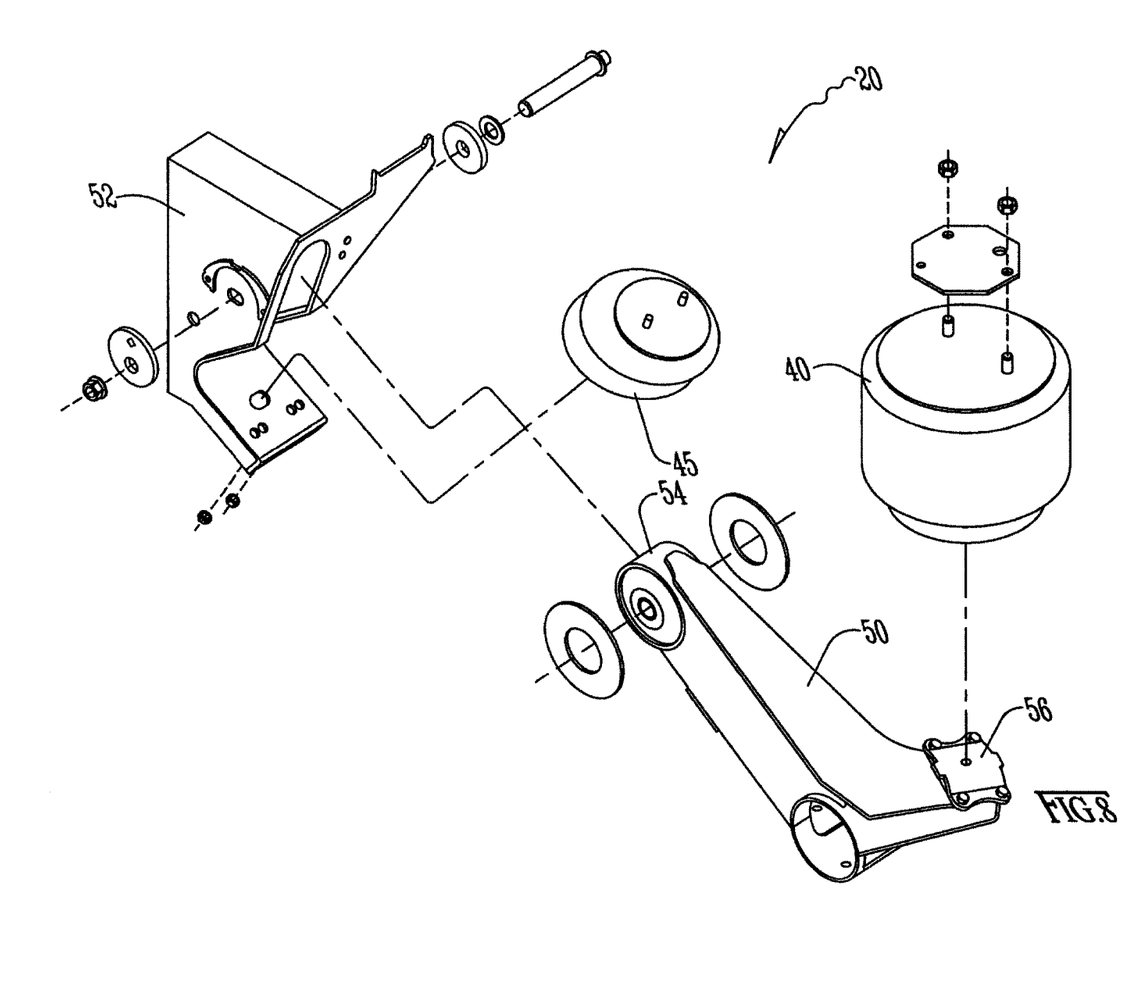
FIG. 8 is an enlarged-scale exploded perspective view that is comparable to FIG. 7 except with the rails and cross members removed from view.
Figure 9:
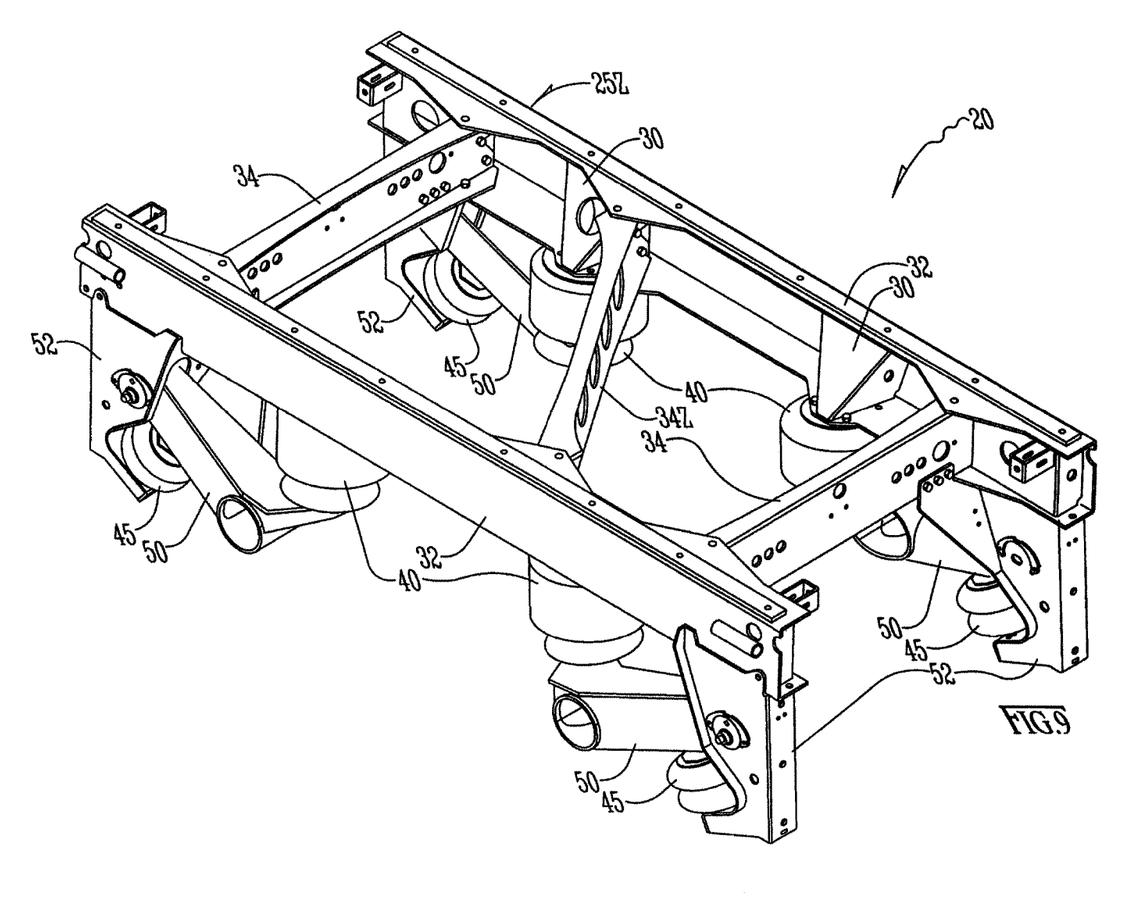
FIG. 9 is a perspective view comparable to FIG. 2 except showing an alternate embodiment of a suspension in accordance with the invention, comprising a two axle arrangement having the forward pair of rocking beams trail their hanger ends as in FIG. 2 also, in contrast to here in FIG. 9 wherein the rearward pair of rocking beams extend forwardly from their hanger ends, and further wherein the rails and cross members of the sliding frame form a Box-Z shaped arrangement.
Figure 10:
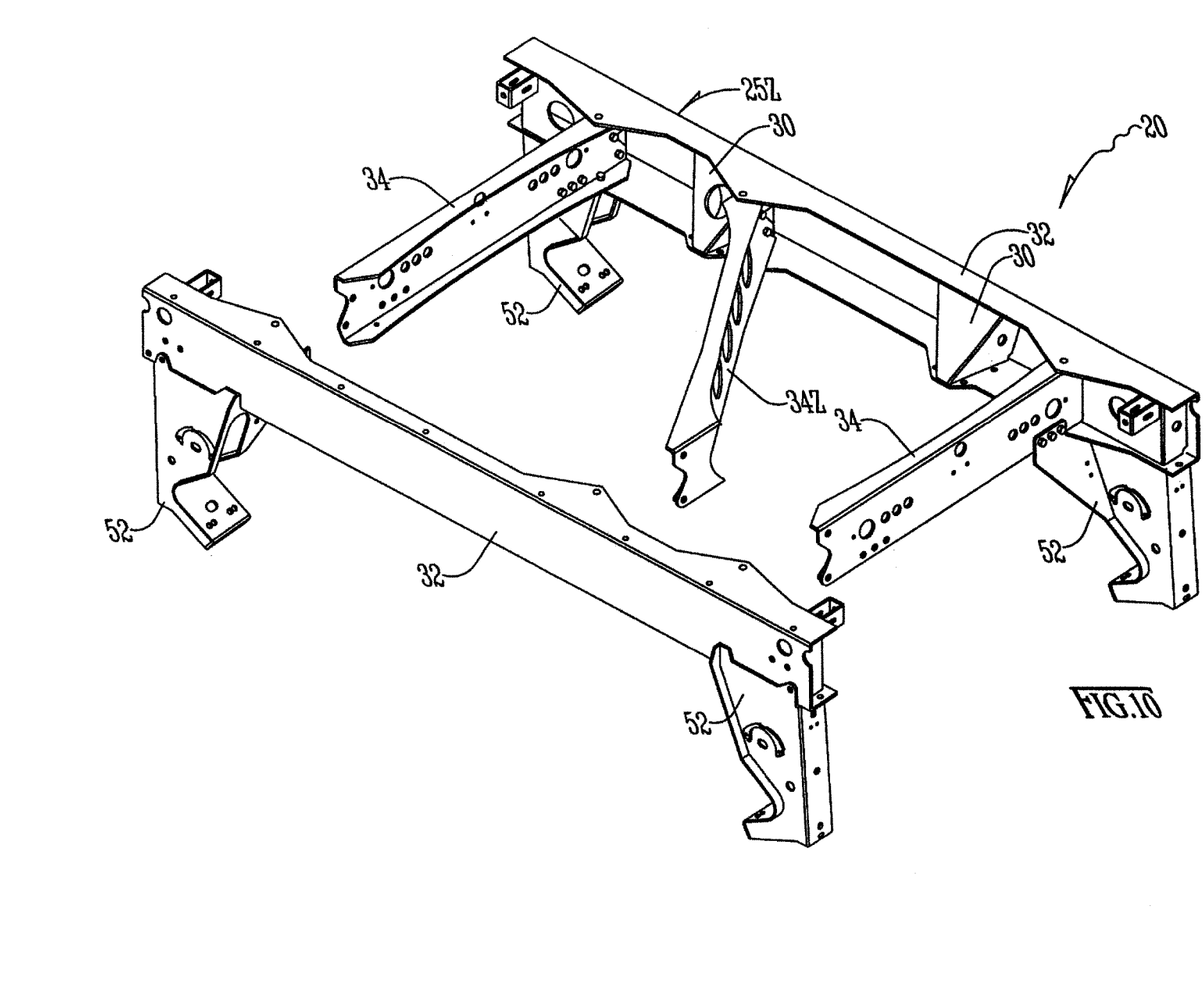

The sliding frame 25I,25Z comprises spaced longitudinal rails 32 held apart by spaced lateral cross-members 34 (or 34Z, see FIGS. 9 and 10). Preferably the rails 32 and cross-members 34 (or 34Z, see FIGS. 9 and 10) are bolted together, and not welded. It is believed that bolts 38 provide improved strength against shear loading. Preferably the sliding frame 25I,25Z is fixed in position to the stringers 26 therefor by bolts 38 as well. Once again, it is believed that bolted connections are easier for the designer to specify according to bolt size, bolt quantities, and bolt pattern or arrangement than is comparably doable for welds, especially in stress environments where the principal stress is shear loading. This provides for improved durability (and perhaps reduced weight).

Again, preferably the support towers 32 are welded to the rails 32, but the cross members 34 (or 34Z, see FIGS. 9 and 10) are bolted.

FIGS. 5-8 show better an oil-free damper solution in accordance with invention for the suspensions of vans, trucks or semi-trailers 22. Hydraulic-oil shock absorbers in accordance with the prior art are high maintenance items. In many states, if a truck driver pulls into a weigh station and has an oil-leaking hydraulic oil shock absorber, he or she will be liable for a ticket.

In the suspension 20 in accordance with the invention, the conventional primary air spring 40 is retained in the design, but the conventional external hydraulic-oil shock absorber (not shown) is replaced with an external rubber bellows air spring dampener means 45:—ie., an air shock 45. These two opposing air springs 40 and 45 (ie., the primary air spring 40 and the secondary air spring 45 serving as a shock absorber, or air shock 45) are connected in parallel to counter-act against each other. The air shock 45 will act like an air dashpot to dampen the primary air spring 40 that carries the load of the vehicle 22. So, in this suspension 20 there are two distinct air spring means 40 and 45, one primary air spring 40 to carry the load of the vehicle 22 and one secondary air spring 45 to dampen the oscillations of the primary—load-carrying—air spring 40.

The suspension 20 comprises left and right trailing beams 50 suspended and pivoted from hangers 52 hanging from the sliding frame 25I,25Z. The trailing beams 50 and hangers 52 are, like so many of the other parts to be described herein, preferably fabricated from steel. That is, preferably plate steel is formed by brake presses to fold at fold lines and thereby produce flanges and/or channels. Connections are formed either by fasteners or by welding as more particularly described in any particular instance. Each trailing beam 50 is elongated between a pivot connection 54 and a seat 56 for an air spring 40.

When the seat 56 of the air spring 40 is forced up into the sliding frame 25I,25Z by road conditions, the primary air spring 40 is forced to foreshorten (ie., in compression) while the counter-acting secondary air spring 45 (air shock) is extended:—the extension of which is retarded by a negative pressurization (or a vacuum force) forming in the air shock 45. Thus the air shock 45 acts (ie., counter-acts against) the contraction of the primary air spring 40 to thereby dampen the contraction (compression) of the primary air spring 40. This air shock 45 force that reacts against the primary air spring 40 contraction is of a dampening effect on the primary air spring 40 as it changes its motion and reduces the free oscillations of the primary air spring 40.

When the primary air spring 40 bounces the other way—and extends (rebound)—the secondary air spring 45 (air shock) is compressed and produces an opposite retarding force to dampen the extension stroke of the bounce of the primary air spring 40. This air shock 45 force that reacts to the primary air spring 40 produces again a dampening effect on the primary air spring 40 as it changes its motion and reduces the free oscillations of the primary air spring 40.

The air shock 45 dampening force can be set and adjusted by several means:—namely, (i) preset pressure in the air spring 45 to give a force, (ii) adaptive proportional air pressure that is connected to the primary air spring 40 so as to give a proportional force, (iii) orifice means in an outlet of the air shock 45 that is connected to an external volume chamber or other air shocks 45, or (iv) a combination of these.

These two air spring means 40 and 45 can be interconnected to one another directly through air tubing where the air shock pressure is regulated to a proportion of the primary air spring 40 to give dampening force. These two air spring means 40 and 45 can act as separate systems where they are not connected but both pressures are sourced from the vehicle height control valve 58 so they are partially adaptive pressures:—eg., the full pressure to carry the load of the vehicle 22 at the desired ride height set by the height control valve 58 versus—or proportional to, according to a 'proportion' chosen a design factor—the air shock pressure 45 as being a regulated pressure of the full pressure.

These two air spring means 40 and 45 can act as separate systems where they are not connected.

Multiple air shock means 45 of the full vehicle system can be interconnected to act as displacement chambers of air for each other. These air shock means 45 can be connected using the tubing to act as capillary damping or they can have orifice valves between them to act as orifice dampeners of the air flow.

The external rubber bellows air spring 45 (ie., air shock) can be of convolute or piston style air spring design.

The external secondary air shock air spring 45 can also act as an over-extension stop for the primary air spring 40, thus eliminating the need for an external over-extension means such as chain or strap. The external secondary air shock air spring 45 can also act as an inexpensive lifting means for the vehicle axle if it is substantial enough to carry the load. This is an advantage as these lifting means are usually extra cost and weight but do save on tire wear and vehicle fuel mileage.

This type of truck and trailer suspension 20 can be used as a fixed hanger suspension on a frame (eg., stringers 26) of a van or trailer 22 or as a sliding axle suspension where the sub-frame 25I,25Z of the suspension 20 can slide relative to the vehicle frame 26 for positioning to adjust load or maneuverability.

Pause can be taken to consider the following aspects of the invention, according to the following item numbers, and further in accordance with FIGS. 1-10.

A slider frame 25I,25Z for vans or semi-trailers 22 and under which an air-spring suspension is mounted optionally comprises:—
- a pair of spaced left and right rails 32, each rail 32 comprising an elongated channel extending between a forward end 62 and rearward end 64, said each channel comprising an outboard web portion 66 spacing upper and lower flange portions 72 and 74;
- a plurality of elongated cross-members 34 (or 34Z, see FIGS. 9 and 10) extending laterally between and rigidly affixed to the left and right rails 32 to form a rigid frame 25I,25Z structure; and
- a plurality of independent air spring towers 30;
- wherein the lower flanges 74 of the channels of the left and right rails 32 respectively have a plurality of independent, inboard enlargements forming air-spring seat portions 56;
- wherein each air spring tower 30 comprises a brace structure rigidly affixed between a respective one of the air-spring seat portions 56, and, one, the other or both of the proximate web portion 66 and/or upper flange portion 72.

The air-spring seat portions 56 might comprise enlargements in the lower flanges 74. The plurality of independent air-spring towers 30 and plurality of independent air-spring seat portions 56 might comprise four apiece respectively, two for the left rail 32 and an opposite two for the right rail 32. Each air-spring tower 30 might comprise a semi-tubular form.

Referring back to two paragraphs above, each air-spring tower 30 might comprise a trapezoidal sidewall having a parallel short and long edge spaced by opposite oblique edges, wherein the short edge is affixed to the respective air-spring seat portion 56, and, the long edge is affixed to one or the other of the proximate web portion 66 or upper flange portion 72. The proximate web portion 66 and upper flange portion 72 might meet at a crease such that the long edge is affixed to the proximate web portion 66 and upper flange portion 72 at the crease therebetween. The air spring tower 30 might further comprise a pair of triangular sidewalls for each air spring tower 30, each one of the triangular sidewalls having a first edge affixed solid to and/or being a monolithic unit with one oblique edge of the respective air spring tower 30, a second edge affixed to the respective web portion 66 of the respective rail 32, and a third edge affixed to the respective upper flange portion 72 of the respective rail 32. The triangular sidewalls and trapezoidal sidewall might be formed as a monolithic unit out of plate steel. The rails 32 preferably comprise plate steel channels, and all edges of the air spring tower 30 are affixed thereto are affixed by welds.

Referring back to three paragraphs above, the air spring towers 30 might comprise plate steel forms that form a hollow, truncated, and semi-tubular pyramidal or conic form, which extends and flares from a truncated end to a spaced base end; and, the truncated end is affixed to the air-spring seat portion 56, and the remainder of the pyramidal or conic form comprises edges affixed to at least the web portion 66 of the respective rail 32. The proximate web portion 66 and upper flange portion 72 might meet at a crease such that the remainder of the pyramidal or conic form comprises a further edge affixed to the proximate web portion 66 and upper flange portion 72 at the crease therebetween. The rails 32 might comprise plate steel channels, and all edges of the air spring tower 30 are affixed thereto are affixed by welds. The plurality of cross members 34 (or 34Z, see FIGS. 9 and 10) comprise plate steel forms, and, are affixed to the rails 32 by bolts 38.

The plurality of cross members 34 (see FIGS. 2-4) might comprise three in number and arranged in a Box-I arrangement 25I.

The plurality of cross members 34 and 34Z might comprise three in number and arranged in a Box-Z arrangement 25Z (see FIGS. 9 and 10). In this arrangement, the plurality of independent air-spring towers 30 and plurality of independent air-spring seat portions 56 comprise four apiece respectively, a front and rear tower 30 and seat portion 56 for the left rail 32 and an opposite front and rear tower 30 and seat portion 56 for the right rail 32; and, the Box-Z arrangement 25Z comprises a central, oblique cross member 34Z which extends between opposite ends, one end of which is affixed to or proximate to a front tower 30 of the left or right rail 32, and, the other end of which is affixed to or proximate to a rear tower 30 of the other of the right or left rail 32.

In other words, the rails 32, cross-members 34 (or 34Z, see FIGS. 9 and 10) and air spring towers 30 of the slider frame 25I,25Z might comprise plate steel forms. The air spring towers 30 are preferably affixed to the rails 32 by welds, while the cross members 34 (or 34Z, see FIGS. 9 and 10) are preferably affixed to the rails 32 by bolts 38. The plurality of cross members 34 and 34Z might comprise three in number and arranged in a Box-Z arrangement 25Z. The plurality of independent air-spring towers 30 and plurality of independent air-spring seat portions 56 might comprise four apiece respectively, a front and rear tower 30 and seat portion 56 for the left rail 32 and an opposite front and rear tower 30 and seat portion 56 for the right rail 32; and, the Box-Z arrangement 25Z comprises a central, oblique cross member 34Z which extends between opposite ends, one end of which is affixed to or proximate to a front tower 30 of the left or right rail 32, and, the other end of which is affixed to or proximate to a rear tower 30 of the other of the right or left rail 32.

It is one aspect (among others) of the the slider frame 25Z that—regardless of construction materials and methods of fastening parts together—the plurality of cross members 34 and 34Z comprise three in number and arranged in a Box-Z arrangement 25Z; the plurality of independent air-spring towers 30 and plurality of independent air-spring seat portions 56 comprise four apiece respectively, a front and rear tower 30 and seat portion for the left rail 32 and an opposite front and rear tower 30 and seat portion 56 for the right rail 32; and, the Box-Z arrangement 25Z comprises a central, oblique cross member 34Z which extends between opposite ends, one end of which is affixed to or proximate to a front tower 30 of the left or right rail 32, and, the other end of which is affixed to or proximate to a rear tower 30 of the other of the right or left rail 32.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A slider frame for vans or semi-trailers under which an air-spring suspension is mounted, comprising:
   a pair of spaced left and right rails, each rail comprising an elongated channel extending between a forward end and rearward end, said each channel comprising an outboard web portion spacing an upper and lower flange portions;
   a plurality of elongated cross-members extending laterally between and rigidly affixed to the left and right rails to form a rigid frame structure; and
   a plurality of independent air spring towers;
   wherein the lower flange portions of the channels of the left and right rails respectively have a plurality of independent, inboard enlargements forming air-spring seat portions;
   wherein each air spring tower comprises a brace structure rigidly affixed between a respective one of the air-spring seat portions, and, one, the other or both of the proximate web portion and/or upper flange portion;
   wherein each air-spring tower comprises a trapezoidal sidewall having a parallel short and long edge spaced by opposite oblique edges, wherein the short edge is affixed to the respective air-spring seat portion, and, the long edge is affixed to one or the other of the proximate web portion or upper flange portion.

2. The slider frame of claim 1, wherein:
   the plurality of independent air-spring towers and plurality of independent air-spring seat portions comprise four apiece respectively, two for the left rail and an opposite two for the right rail.

3. The slider frame of claim 1, wherein:
   each air-spring tower comprises a semi-tubular form.

4. The slider frame of claim 1, wherein:
   the proximate web portion and upper flange portion meet at a crease; and
   the long edge is affixed to the proximate web portion and upper flange portion at the crease therebetween.

5. The slider frame of claim 4, further comprising:
   a pair of triangular sidewalls for each air spring tower, each one of the triangular sidewalls having a first edge affixed solid to and/or being a monolithic unit with one oblique edge of the respective air spring tower, a second edge affixed to the respective web portion of the respective rail, and a third edge affixed to the respective upper flange portion of the respective rail.

6. The slider frame of claim 5, wherein:
   the triangular sidewalls and trapezoidal sidewall form a monolithic unit formed out of plate steel.

7. The slider frame of claim 6, wherein:
   the rails comprise plate steel channels, and all edges of the air spring tower are affixed thereto are affixed by welds.

8. A slider frame for vans or semi-trailers under which an air-spring suspension is mounted, comprising:
   a pair of spaced left and right rails, each rail comprising an elongated channel extending between a forward end and rearward end, said each channel comprising an outboard web portion spacing an upper and lower flange portions;
   a plurality of elongated cross-members extending laterally between and rigidly affixed to the left and right rails to form a rigid frame structure; and
   a plurality of independent air spring towers;
   wherein the lower flange portions of the channels of the left and right rails respectively have a plurality of independent, inboard enlargements forming air-spring seat portions;
   wherein each air spring tower comprises a brace structure rigidly affixed between a respective one of the air-spring seat portions, and, one, the other or both of the proximate web portion and/or upper flange portion;
   wherein the air spring towers comprise plate steel forms that form a hollow, truncated, and semi-tubular pyramidal or conic form, which extends and flares from a truncated end to a spaced base end; and
   the truncated end is affixed to the air-spring seat portion, and the remainder of the pyramidal or conic form comprises edges affixed to at least the web portion of the respective rail.

9. The slider frame of claim 8, wherein:
   the proximate web portion and upper flange portion meet at a crease; and
   the pyramidal or conic form comprises a further edge affixed to the proximate web portion and upper flange portion at the crease therebetween.

10. The slider frame of claim 8, wherein:
    the rails comprise plate steel channels, and all edges of the air spring tower are affixed thereto are affixed by welds.

11. The slider frame of claim 10, wherein:
    the plurality of cross members comprise plate steel forms, and, are affixed to the rails by bolts.

12. The slider frame of claim 11, wherein:
    the plurality of cross members comprise three members arranged in a Box-I arrangement.

13. The slider frame of claim 12, wherein:
    the plurality of cross members comprise three members arranged in a Box-Z arrangement.

14. The slider frame of claim 13, wherein:
    the plurality of independent air-spring towers and plurality of independent air-spring seat portions comprise four apiece respectively, a front and rear tower and seat portion for the left rail and an opposite front and rear tower and seat portion for the right rail; and
    the Box-Z arrangement comprises a central, oblique cross member which extends between opposite ends, one end of which is affixed to or proximate to a front tower of the left or right rail, and, the other end of which is affixed to or proximate to a rear tower of the other of the right or left rail.

15. A slider frame for vans or semi-trailers under which an air-spring suspension is mounted, comprising:
    a pair of spaced left and right rails, each rail comprising an elongated channel extending between a forward end and rearward end, said each channel comprising an outboard web portion spacing an upper and lower flange portions;
    a plurality of elongated cross-members extending laterally between and rigidly affixed to the left and right rails to form a rigid frame structure; and
    a plurality of independent air spring towers;
    wherein the lower flange portions of the channels of the left and right rails respectively have a plurality of independent, inboard enlargements forming air-spring seat portions;
    wherein each air spring tower comprises a brace structure rigidly affixed between a respective one of the air-spring seat portions, and, one, the other or both of the proximate web portion and/or upper flange portion;
    wherein the rails, cross-members and air spring towers comprise plate steel forms;
    the air spring towers are affixed to the rails by welds; and
    the cross members are affixed to the rails by bolts.

16. The slider frame of claim 15, wherein:
the plurality of cross members comprise three members arranged in a Box-Z arrangement.

17. The slider frame of claim 16, wherein:
the plurality of independent air-spring towers and plurality of independent air-spring seat portions comprise four apiece respectively, a front and rear tower and seat portion for the left rail and an opposite front and rear tower and seat portion for the right rail; and the Box-Z arrangement comprises a central, oblique cross member which extends between opposite ends, one end of which is affixed to or proximate to a front tower of the left or right rail, and, the other end of which is affixed to or proximate to a rear tower of the other of the right or left rail.

* * * * *

UNITED STATES PATENT AND TRADEMARK OFFICE
CERTIFICATE OF CORRECTION

Page 1 of 1

PATENT NO. : 10,011,153 B1
APPLICATION NO. : 14/667214
DATED : July 3, 2018
INVENTOR(S) : Klein et al.

It is certified that error appears in the above-identified patent and that said Letters Patent is hereby corrected as shown below:

On the Title Page

At Item (12):
Delete "Klein" and insert --Klein et al--

At Item (72), Inventors:
On line two add the name Kevin C. Schlack, Springfield, MO (US)

Signed and Sealed this
Fourteenth Day of May, 2019

Andrei Iancu
*Director of the United States Patent and Trademark Office*